(12) United States Patent
Tu et al.

(10) Patent No.: US 7,159,077 B2
(45) Date of Patent: Jan. 2, 2007

(54) DIRECT PROCESSOR CACHE ACCESS WITHIN A SYSTEM HAVING A COHERENT MULTI-PROCESSOR PROTOCOL

(75) Inventors: Steven J. Tu, Phoenix, AZ (US);
Samantha J. Edirisooriya, Tempe, AZ (US); Sujat Jamil, Chandler, AZ (US);
David E. Miner, Chandler, AZ (US);
R. Frank O'Bleness, Tempe, AZ (US);
Hang T. Nguyen, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 10/882,509

(22) Filed: Jun. 30, 2004

(65) Prior Publication Data

US 2006/0004961 A1 Jan. 5, 2006

(51) Int. Cl.
*G06F 12/00* (2006.01)

(52) U.S. Cl. .................... 711/124; 711/118; 711/146

(58) Field of Classification Search ............... 711/118, 711/124, 146
See application file for complete search history.

(56) References Cited

U.S. PATENT DOCUMENTS

| 2002/0194434 A1* | 12/2002 | Kurasugi ............... 711/137 |
| 2004/0128450 A1 | 7/2004 | Edirisooriya et al. |
| 2005/0262235 A1* | 11/2005 | Childress et al. ............ 709/224 |

* cited by examiner

*Primary Examiner*—Reba I. Elmore
(74) *Attorney, Agent, or Firm*—Blakely, Sokoloff, Taylor & Zafman LLP

(57) ABSTRACT

A computer system has a plurality of processors in a multiprocessor system with each processor associated with a cache memory. The cache traffic is monitored by the respective processors to determine the load for each of the cache memories. Signals corresponding to the cache loads are generated and analyzed. A target processor is selected for a push data operation from a bus agent to the cache memory using the load information. The push operations to the caches are optimized based on the cache traffic information.

30 Claims, 6 Drawing Sheets

DIRECT PROCESSOR CACHE ACCESS WITHIN A SYSTEM HAVING A COHERENT MULTI-PROCESSOR PROTOCOL

TECHNICAL FIELD

Embodiments of the invention relate to multi-processor computer systems. More particularly, embodiments of the invention relate to allowing external bus agents to push data to a cache corresponding to a processor in a multi-processor computer system.

BACKGROUND

In current multi-processor systems, including Chip Multi-Processors, it is common for an input/output (I/O) device such as, for example, a network media access controller (MAC), a storage controller, a display controller, to generate temporary data to be processed by a processor core. Using traditional memory-based data transfer techniques, the temporary data is written to memory and subsequently read from memory by the processor core. Thus, two memory accesses are required for a single data transfer.

Because traditional memory-based data transfer techniques require multiple memory accesses for a single data transfer, these data transfers may be bottlenecks to system performance. The performance penalty can be further compounded by the fact that these memory accesses are typically off-chip, which results in further memory access latencies as well as additional power dissipation. Thus, current data transfer techniques result in system inefficiencies with respect to performance and power.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are embodiments of an architecture that supports direct cache access (DCA, or "push cache"), which allows a device to coherently push data to an internal cache of a target processor. In one embodiment the architecture includes a pipelined system bus, a coherent cache architecture and a DCA protocol. The architecture provides increased data transfer efficiencies as compared to the memory transfer operations described above.

More specifically, the architecture may utilize a pipelining bus feature and internal bus queuing structure to effectively invalidate internal caches, and effectively allocate internal data structures that accept push data requests. One embodiment of the mechanism may allow devices connected to a processor to directly move data into a cache associated with the processor. In one embodiment a PUSH operation may be implemented with a streamlined handshaking procedure between a cache memory, a bus queue and/or an external (to the processor) bus agent.

The handshaking procedure may be implemented in hardware to provide high-performance direct cache access. In traditional data transfer operations an entire bus may be stalled for a write operation to move data from memory to a processor cache. Using the mechanism described herein, a non-processor bus agent may use a single write operation to move data to a processor cache without causing extra bus transactions and/or stalling the bus. This may decrease the latency associated with data transfer and may improve processor bus availability.

Also described herein is an optional optimization mechanism that may allow for more efficient allocation of data push operations. In one embodiment, the optimized mechanism includes an optimizer circuit that may coordinate data pushes by, for example, directing data pushes to a least loaded processor. In one embodiment, parameters used by the optimization mechanism may be software controllable to allow for modifying the functionality of the optimization mechanism.

Figure 1:
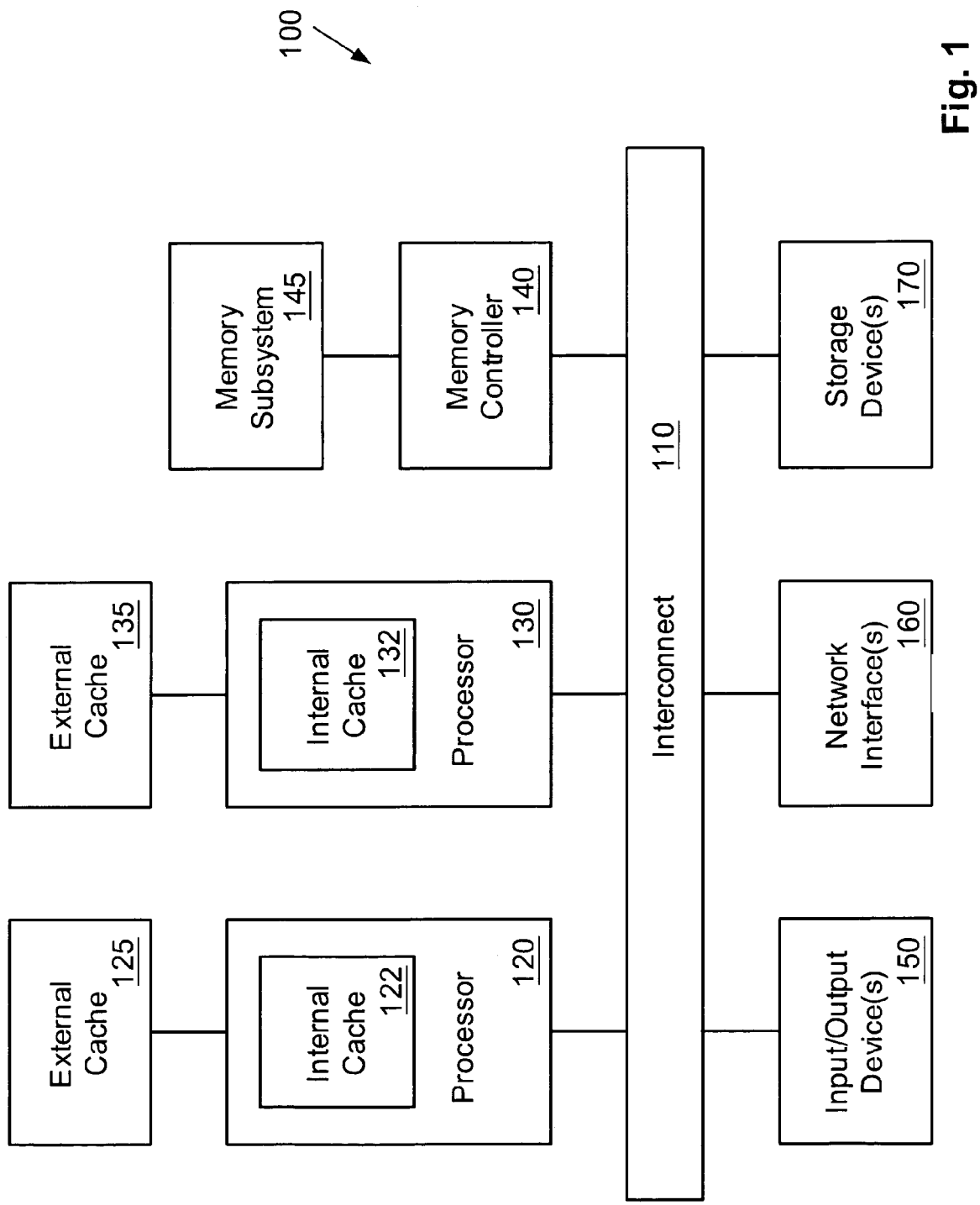
FIG. 1 is a block diagram of one embodiment of a computer system.

FIG. 1 is a block diagram of one embodiment of a computer system. The computer system illustrated in FIG. 1 is intended to represent a range of electronic systems including computer systems, network traffic processing systems, control systems, or any other multi-processor system. Alternative computer (or non-computer) systems can include more, fewer and/or different components. In the description of FIG. 1 the electronic system is referred to as a computer system; however, the architecture of the computer system as well as the techniques and mechanisms described herein are applicable to many types of multi-processor systems.

In one embodiment, computer system 100 may include interconnect 110 to communicate information between components. Processor 120 may be coupled to interconnect 110 to process information. Further, processor 120 may include internal cache 122, which may represent any number of internal cache memories. In one embodiment, processor 120 may be coupled with external cache 125. Computer system 100 may further include processor 130 that may be coupled to interconnect 110 to process information. Processor 130 may include internal cache 132, which may represent any number of internal cache memories. In one embodiment, processor 130 may be coupled with external cache 135.

While computer system 100 is illustrated with two processors, computer system 100 may include any number of processors and/or co-processors. Computer system 100 may also include random access memory controller 140 coupled with interconnect 110. Memory controller 140 may act as an interface between interconnect 110 and memory subsystem 145, which may include one or more types of memory. For example, memory subsystem 145 may include random access memory (RAM) or other dynamic storage device to store information and instructions to be executed by processor 120 and/or processor 130. Memory subsystem 145 also can be used to store temporary variables or other intermediate information during execution of instructions by processor 120 and/or processor 130. Memory subsystem may further include read only memory (ROM) and/or other static storage device to store static information and instructions for processors 120 and/or processor 130.

Interconnect 110 may also be coupled with input/output (I/O) devices 150, which may include, for example, a display device, such as a cathode ray tube (CRT) controller or liquid crystal display (LCD) controller, to display information to a user, an alphanumeric input device, such as a keyboard or touch screen to communicate information and command selections to processor 120, and/or a cursor control device, such as a mouse, a trackball, or cursor direction keys to communicate direction information and command selections to processor 102 and to control cursor movement on a display device. Various I/O devices are known in the art.

Computer system 100 may further include network interface(s) 160 to provide access to one or more networks, such as a local area network, via wired and/or wireless interfaces. A wired network interface may include, for example, a network interface card configured to communicate using an Ethernet or optical cable. A wireless network interface may include one or more antennae (e.g., a substantially omnidirectional antenna) to communicate according to one or more wireless communication protocols. Storage device 170 may be coupled to interconnect 110 to store information and instructions.

Instructions are provided to memory subsystem 145 from storage device 170, such as magnetic disk, a read-only memory (ROM) integrated circuit, CD-ROM, DVD, via a remote connection (e.g., over a network via network interface 160) that is either wired or wireless, etc. In alternative embodiments, hard-wired circuitry can be used in place of or in combination with software instructions. Thus, execution of sequences of instructions is not limited to any specific combination of hardware circuitry and software instructions.

An electronically accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

Figure 2:
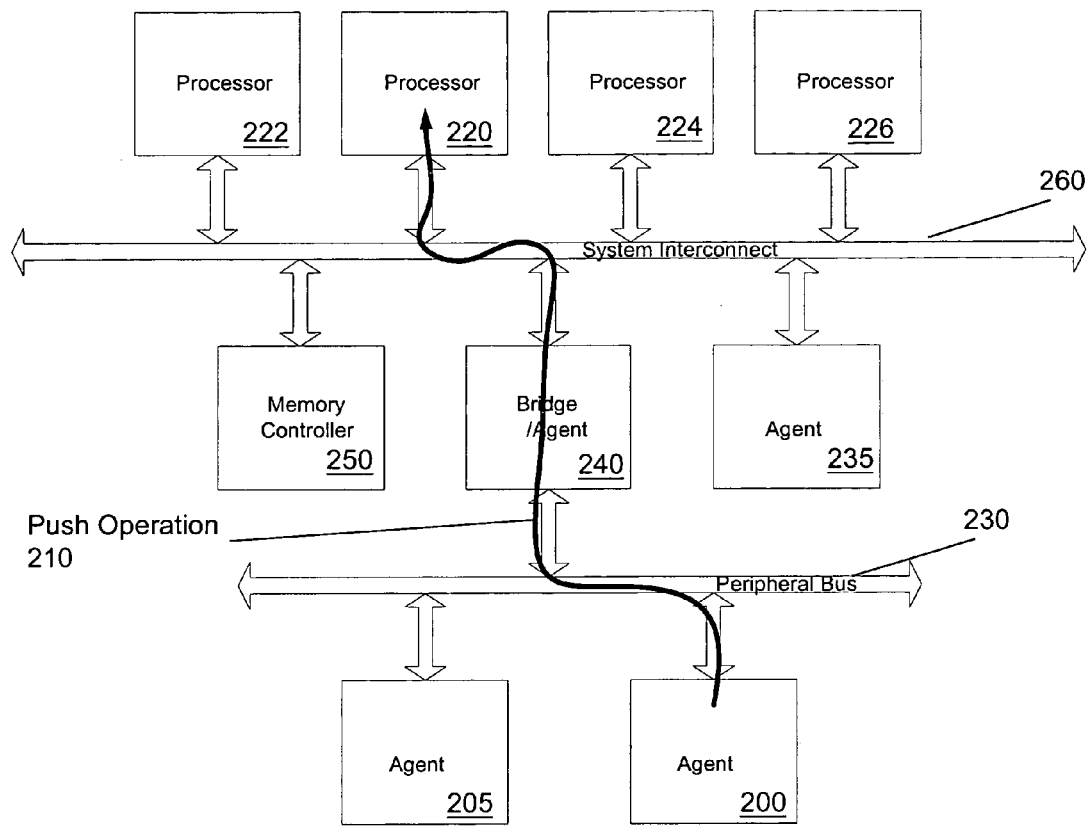
FIG. 2 is a conceptual illustration of a push operation from an external agent.

FIG. 2 is a conceptual illustration of a push operation from an external agent. The example of FIG. 2 corresponds to an external (to the target processor) agent that may push data a processor 220 in a multi-processor system 220, 222, 224, 226. The agent may be, for example, a direct memory access (DMA) device, a digital signal processor (DSP), a packet processor, or any other system component external to the target processor.

The data that is pushed by agent 200 may correspond to a full cache line or the data may correspond to a partial cache line. In one embodiment, during push operation 210, agent 200 may push data to an internal cache of processor 220. Thus, the data may be available for a cache hit on a subsequent load to the corresponding address by processor 220.

In the example of FIG. 2, push operation 210 is issued by agent 200 that is coupled to peripheral bus 230, which may also be coupled with other agents (e.g., agent 205). Push operation 210 may be passed from peripheral bus 230 to system interconnect 240 by bridge/agent 240. Agents may also be coupled with system interconnect 260 (e.g., agent 235). The target processor (processor 220) may receive push operation 210 from bridge/agent 240 over system interconnect 260. Any number of processors may be coupled with system interconnect 260. Memory controller 250 may also be coupled with system interconnect 260.

Figure 3:
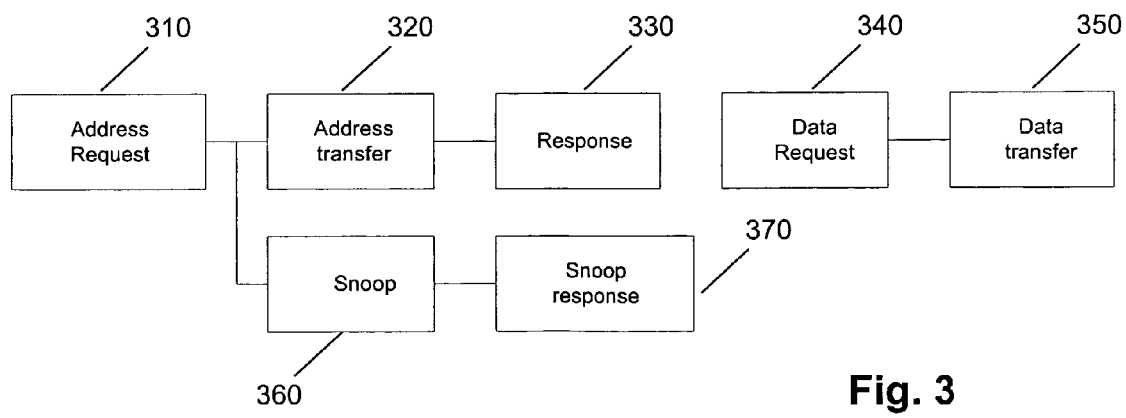
FIG. 3 is a conceptual illustration of a pipelined system bus architecture.

FIG. 3 is a conceptual illustration of a pipelined system bus architecture. In one embodiment, the bus is a free running non-stall bus. In one embodiment, the pipelined system bus includes separate address and data buses, both of which have one or more stages. In one embodiment, the address bus stages may operate using address request stage 310, address transfer stage 320 and address response stage 330. In one embodiment, one or more of the stages illustrated in FIG. 3 may be further broken down into multiple sub-stages.

In one embodiment, snoop agents may include snoop stage 360 and snoop response stage 370. The address stages and the snoop stages may or may not be aligned based on, for example, the details of the bus protocol being used. Snooping is known in the art and is not discussed in further detail herein. In one embodiment, the data bus may operate using data request stage 340 and data transfer stage 350.

In one embodiment the system may support a cache coherency protocol, for example, MSI, MESI, MOESI, etc. In one embodiment, the following cache line states may be used.

TABLE 1

Cache Line States for Target Processor

| State Prior to Address Request | State After Address Request | State After Acknowledge (ACK) Message | State After Data Return |
| --- | --- | --- | --- |
| M | Pending | ACK-M | M |
| O | Pending | ACK-Pending | M |
| E | Pending | ACK-Pending | M |
| S | Pending | ACK-Pending | M |
| I | Pending | ACK-Pending | M |
| Pending | Pending | ACK/Retry-Pending | N/A |
| M | Pending | Retry-M | M |
| O | Pending | Retry-O | M |
| E | Pending | Retry-I | M |
| S | Pending | Retry-I | M |
| I | Pending | Retry-I | M |

In one embodiment, PUSH requests and PUSH operations are performed at the cache line level; however, other granularities may be supported, for example, partial cache lines, bytes, multiple cache lines, etc. In one embodiment, initiation of a PUSH request may be identified by a write line operation with a PUSH attribute. The PUSH attribute may be, for example, a flag or a sequence of bits or other signal that indicates that the write line operation is intended to push data to a cache memory. If the PUSH operation is used to push data that does not conform to a cache line different operations may be used to initiate the PUSH request.

In one embodiment, the agent initiating the PUSH operation may provide a target agent identifier that may be embedded in an address request using, for example, lower address bits. The target agent identifier may also be provided in a different manner, for example, through a field in an instruction or by a dedicated signal path. In one embodiment, a bus interface of a target agent may include logic to determine whether the host agent is the target of a PUSH operation. The logic may include, for example, comparison circuitry to compare the lower address bits with an identifier of the host agent.

In one embodiment, the target agent may include one or more buffers to store an address and data corresponding to a PUSH request. The target agent may have one or more queues and/or control logic to schedule transfer of data from the buffers to the target agent cache memory. Various embodiments of the buffers, queues and control logic are described in greater detail below. Data may be pushed to a cache memory of a target agent by an external agent without processing by the core logic of the target agent. For example, a direct memory access (DMA) device or a digital signal processor (DSP) may use the PUSH operation to push data to a processor cache without requiring the processor core to coordinate the data transfer.

Figure 4:
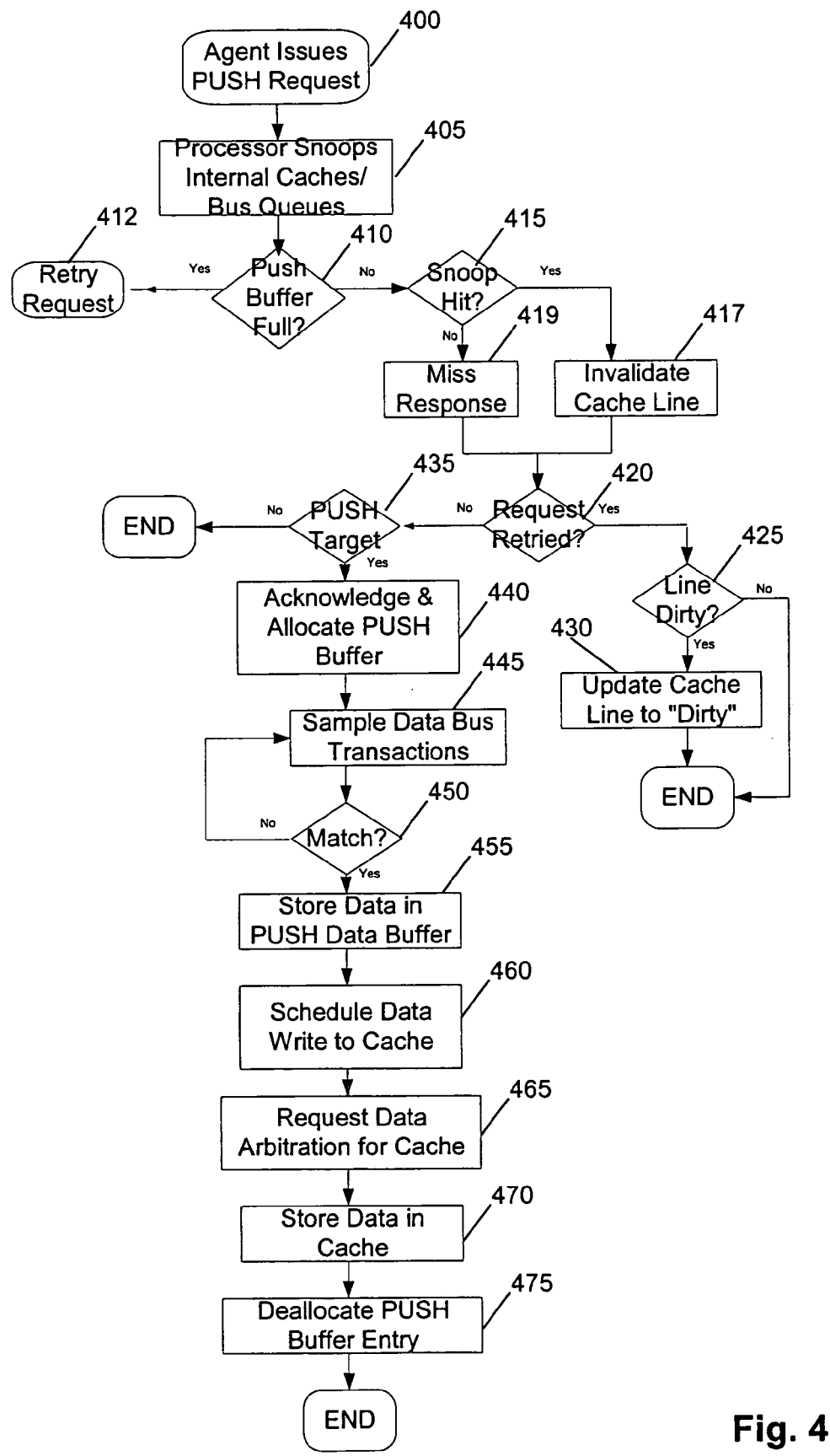
FIG. 4 is a flow diagram of one embodiment of a direct cache access for pushing data from an external agent to a cache of a target processor.

FIG. 4 is a flow diagram of one embodiment of a direct cache access for pushing data from an external agent to a cache of a target processor. The agent having data to be pushed to the target device issues a PUSH request, 400. The PUSH request may be indicated by a specific instruction (e.g., write line) that may have a predetermined bit or bit sequence. In one embodiment the PUSH request may be initiated as a cache line granular level. In one embodiment, the initiating agent may specify the target of the PUSH operation by specifying a target identifier during the address request stage of the PUSH operation.

In one embodiment a processor or other potential target agent may snoop internal caches and/or bus queues, 405. The snooping functionality may allow the processor to determine whether that processor is the target of a PUSH request. Various snooping techniques are known in the art. In one embodiment, the processor snoops the address bus to determine whether the lower address bits correspond to the processor.

In one embodiment, if the target processor push buffer is full, 410, a PUSH request may result in a retry request, 412. In one embodiment, if a request is not retried, the potential target agent may determine whether it is the target of the PUSH request, 415, which may be indicated by a snoop hit. A snoop hit may be determined by comparing an agent identifier with a target agent identifier that may be embedded in the PUSH request.

In one embodiment, if the target agent experiences a snoop hit, 415, the cache line corresponding to the cache line to be pushed is invalidated, 417. If the target agent experiences a snoop miss, 415, a predetermined miss response is performed, 419. The miss response can be any type of cache line miss response known in the art and may be dependent upon the cache coherency protocol being used.

After either the line invalidation, 417 or the miss response, 419, the target agent may determine whether the current PUSH request is retried, 420. If the PUSH request is retried, 420, the target agent determines whether the line was dirty, 425. If the line was dirty, 425, the cache line state may be updated to dirty, 430, to restore the cache line to its original state.

If the PUSH request is not retried, 420, the target agent may determine whether it is the target of the PUSH request, 435. If the target agent is the target of the PUSH request, 435, the target agent may acknowledge the PUSH request and allocate a slot in a PUSH buffer, 440. In one embodiment, the allocation of the PUSH buffer, 440 completes the address phase of the PUSH operation and subsequent functionality is part of a data phase of the PUSH operation. That is, in one embodiment, procedures performed through allocation of the PUSH buffer, 440, may be performed in association with the address bus using the address bus stages described above. Procedures performed subsequent to allocation of the PUSH buffer, 440, may be performed in association with the data bus using the data bus stages described above.

In one embodiment, the target agent may monitor data transactions for transaction identifiers, 445, that correspond to the PUSH request causing the allocation of the PUSH buffer, 440. When a match is identified, 450, the data may be stored in the PUSH buffer, 455.

In one embodiment, in response to the data being stored in the PUSH buffer, 455, bus control logic (or other control logic in the target agent) may schedule a data write to the cache of the target agent, 460. In one embodiment, the bus control logic may enter a write request corresponding to the data in a cache request queue. Other techniques for scheduling the data write operation may also be used.

In one embodiment, control logic in the target agent may request data arbitration for the cache memory, 465, to allow the data to be written to the cache. The data may be written to the cache, 470. In response to the data being written to the cache, the PUSH buffer entry corresponding to the data may be deallocated, 475. If the cache line was previously in a dirty state (e.g., M or O), the cache line may be updated to its original state. If the cache line was previously in a clean state (e.g., E or S), the cache line may be left invalid.

Figure 5:
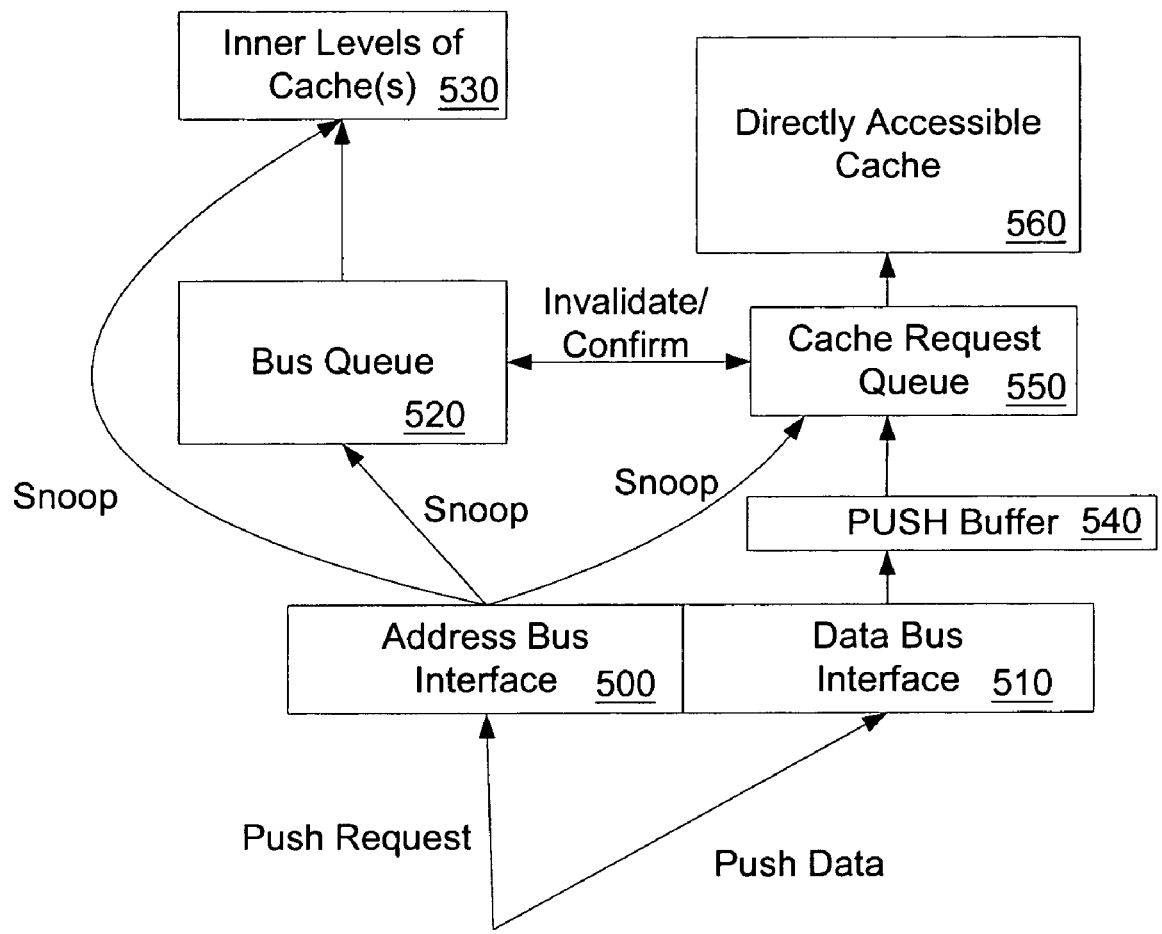
FIG. 5 is a control diagram of one embodiment of a direct cache access PUSH operation.

FIG. 5 is a control diagram of one embodiment of a direct cache access PUSH operation. In one embodiment, target agent 590 may include multiple levels of internal caches. FIG. 5 illustrates only one of many processor architectures including internal cache memories. In the example of FIG. 5, the directly accessible cache is an outer layer cache with ownership capability and the inner level cache(s) is/are write-through cache(s). In one embodiment a PUSH operation may invalidate all corresponding cache lines stored in the inner level cache(s). In one embodiment, the bus queue may be a data structure that tracks in-flight snoop requests and bus transactions.

In one embodiment, a PUSH request may be received by address bus interface 500 and data for the PUSH operation may be received by data bus interface 510. Data bus interface 510 may forward data from a PUSH operation to PUSH buffer 540. The data may be transferred from the PUSH buffer 540 to cache request queue 550 and then to directly accessible cache 560 as described above.

In one embodiment, in response to a PUSH request, address bus interface 500 may snoop transactions between various functional components. For example, address bus interface 500 may snoop entries to cache request queue 550, bus queue 520 and/or inner level cache(s) 530. In one embodiment, invalidation and/or confirmation messages may be passed between bus queue 520 and cache request queue 550.

In one embodiment, within a multi-processor system, each processor core may have an associated local cache memory structure. The processor core may access the associated local cache memory structure for code fetches and data reads and writes. The cache utilization may be affected by program cacheability and the cache hit rate of the program that is being executed.

For a processor core that supports the PUSH operation, the external bus agent may initiate a cache write operation from outside of the processor. Both the processor core and the external bus agent may compete for cache bandwidth. In one embodiment, a horizontal processing model may be used in which multiple processors may perform equivalent tasks and data may be pushed to any processor. Allocation of traffic associated with PUSH operations may improve performance by avoiding unnecessary PUSH request retires.

Figure 6:
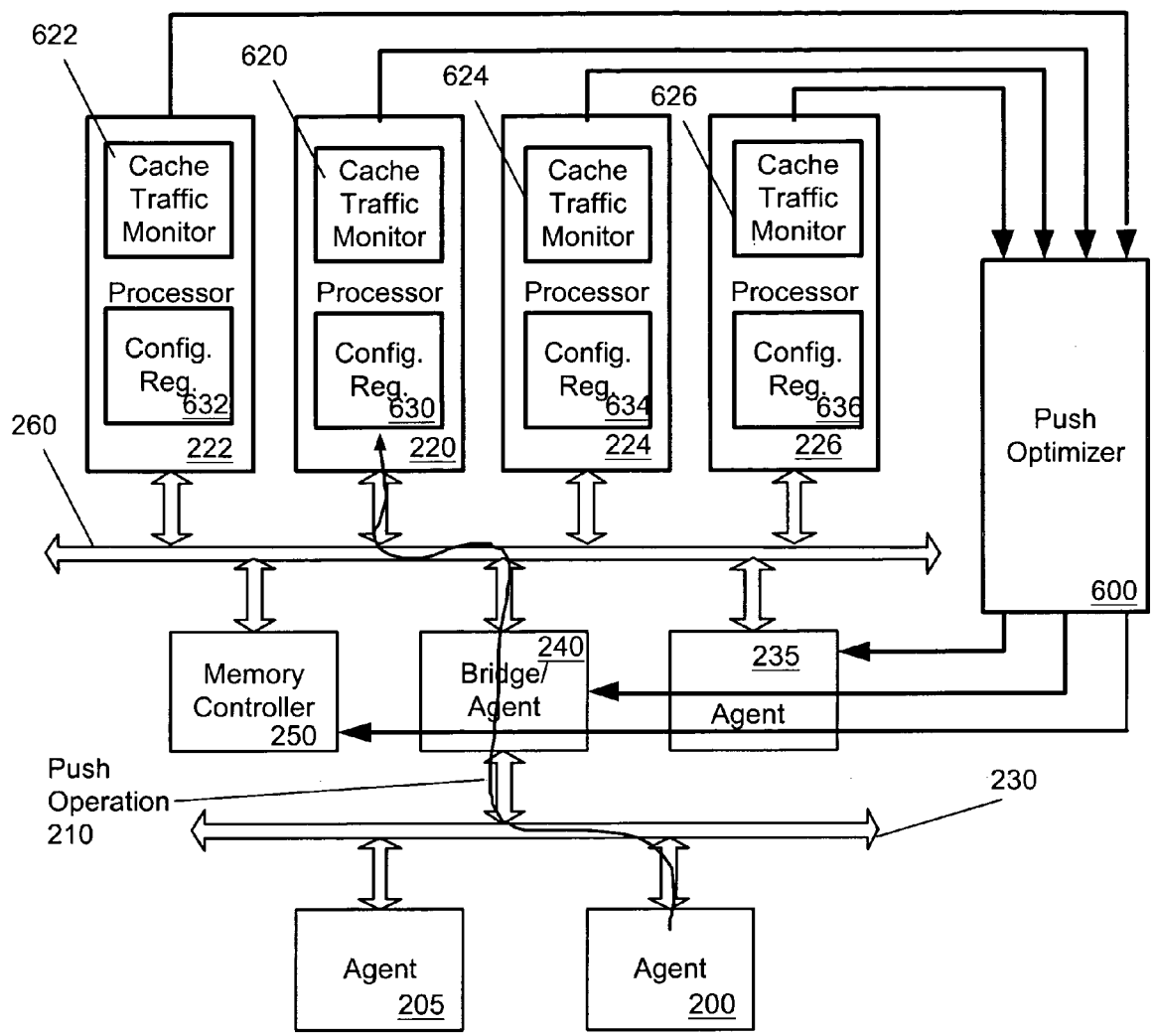
FIG. 6 is a block diagram of one embodiment of an architecture to support an optimization of a push operation from an external agent.

FIG. 6 is a block diagram of one embodiment of an architecture to support an optimization of a push operation from an external agent. In one embodiment, three elements may be added to the architecture of FIG. 2 that may provide increased performance. In one embodiment, the three components may include a push optimizer, a cache traffic condition monitor within the processor microarchitecture and/or software configuration functionality, each of which is described below.

In one embodiment, cache optimizer 600 may use cache loading feedback information that may be transmitted by one or more target processors (e.g., 220, 222, 224, 226) to determine the least loaded processor (or a processor having other pre-selected characteristics). In one embodiment, push optimizer may indicate the least loaded processor to one or more agents (e.g., 235, 240, 250). In one embodiment, for a given time, if an agent has a valid PUSH request to send the agent may use the processor indicated by push optimizer 600 as the target of the PUSH request and may embed the identifier corresponding to the least loaded processor in an address request attribute corresponding to the PUSH request. The address request attribute, as part of the address request, may be asserted during the address stage and may define the target processor for the PUSH request.

The cache loading feedback information may be constructed to a multi-level cache loading structure. The multi-level cache loading structure may be determined based on processor internal cache architecture and may correspond to multiple levels of cache that may support a PUSH operation. The system may also execute software that may be used to configure one or more processors to have a different bandwidth than would otherwise be available.

In one embodiment, one or more of processors 220, 222, 224 and 226 include a cache traffic condition monitor (e.g., 620, 622, 624, 626). In one embodiment, processors 220, 222, 224 and/or 226 may include multiple levels of cache memory. Push requests may target an outer level of cache memory for a target processor. In one embodiment, the processor core and the external agents have access to at least one level of cache memory (directly accessible cache in FIG. 5).

In one embodiment, a processor may include a PUSH request queue for both processor core cache requests and PUSH requests that have access to the directly accessible cache memory. Information may be collected from these queues regarding the number of outstanding requests, type of cache access request and/or priority of the request(s).

In one embodiment, system software may provide a "watermark" level for a cache memory queues that may indicate a level beyond which a cache is considered highly loaded or busy. The cache traffic condition monitors may compare the watermark with the number of entries in the cache memory queues to generate an indication of loading in the respective processors. Push optimizer 600 may receive the indications of loading from one or more processors and determine a preferred target for a subsequent PUSH request.

In one embodiment, cache optimization software may be supported by configuration registers and programmable target processor availability. In one embodiment, configuration registers (e.g., 630, 632, 634, 636) within the respective processors may be accessible by processor firmware. The configuration registers may define what types of requests are considered high priority loading requests. For example, a write request may be considered a high priority loading request as compare to a cache tag lookup request because writes may involve a read and a modified write request which may consume more cache bandwidth than a cache tag lookup request.

In one embodiment, push optimizer 600 may have support a programmable target processor availability level. In a system that may have an asymmetric program stack, one or more processors may run more code than other processors. This type of information may be used by push optimizer 600 in determining a target of a PUSH request. In general, the software configuration model may allow a more flexible system resource allocation by enabling a more balanced use of all system resources to improve system performance.

Figure 7:
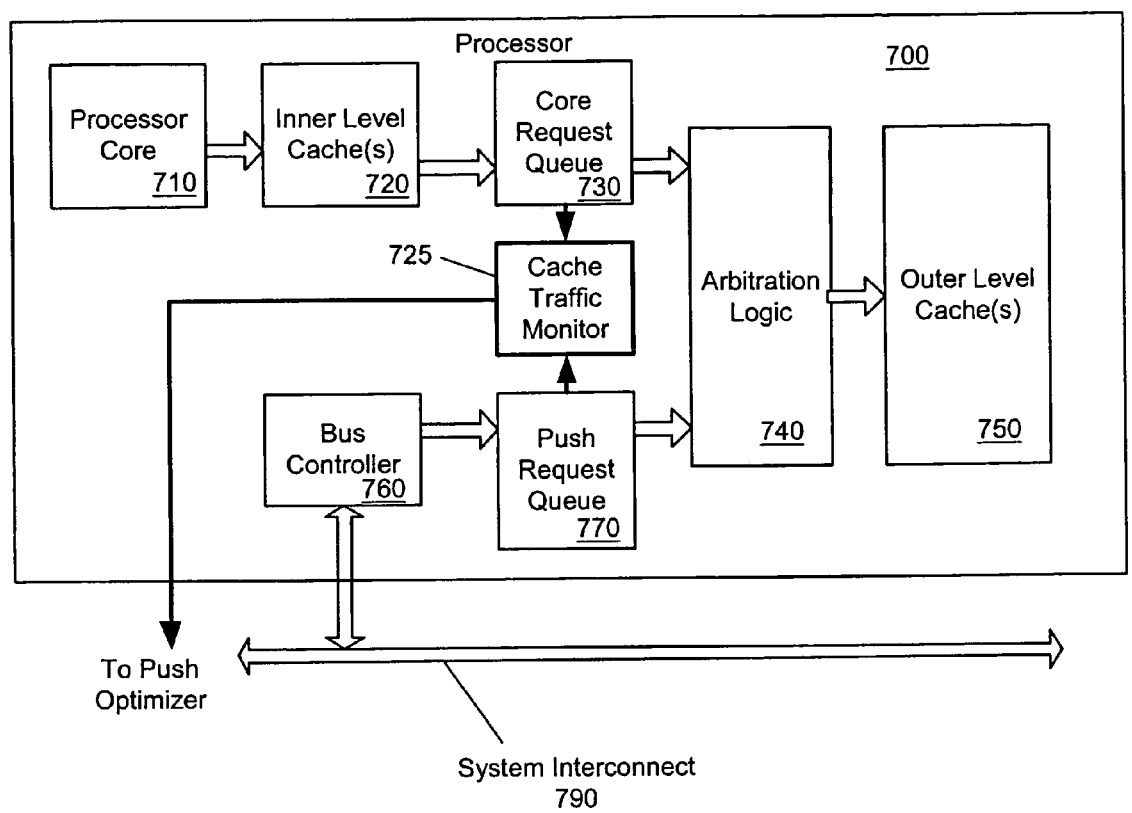
FIG. 7 is a block diagram of a cache loading monitor that may be part of a target processor that supports a push operation from an external agent.

FIG. 7 is a block diagram of a cache loading monitor that may be part of a target processor that supports a push operation from an external agent. In one embodiment, processor 700 may be coupled with system interconnect 790 via bus controller 760. Bus controller 760 may forward data to push request queue 770 as described above.

Processor core 710 may include processing circuitry that, during execution of instructions, may cause data to be written to inner level cache(s) 720, which may forward the data to core request queue 730. In one embodiment, arbitration logic 740 may be coupled with both core request queue 730 and push request queue 770 and may grant permission for data from either core request queue 730 or push request queue 770 to be written to outer level cache 750. Any type of arbitration scheme known in the art may be used.

In one embodiment, cache traffic monitor 725 may also be coupled with core request queue 730 and push request queue 770 and may monitor the respective levels (or lengths) and/or other information corresponding to entries in core request queue 730 and push request queue 770. Cache traffic monitor 725 may generate signals as described above to be transmitted to a push optimizer (not shown in FIG. 7)

In advanced processing systems, non-processor agents, for example a packet processing agent in a packet processing system may push a packet directly to a processor cache rather than to main memory. A processor can then access the packet in cache memory rather than in main memory. This may improve system performance.

In systems implementing a horizontal software model where each processor may ran the same stack of software protocols, system processing performance may be scaled upwards by adding one or more processors. In such systems, data from non-processor agents may be written directly into one the cache of one processor and the data may be used by another processor, for example, via on-chip data intervention. Compared to obtaining data from memory, cache to cache intervention may result in increased performance and/or decreased power consumption.

If non-processor agents are not notified of target processor loading at the time of the PUSH request, the data may be pushed to a processor having a greater load as compared to other processors in the system. This may result in the PUSH request being retried due to unavailability of the target processor internal push buffers and internal cache bandwidth. This may be avoided by targeting the PUSH request to a processor having a lower load.

Processors with higher work loading may be likely to not be scheduled by the host operating system to process PUSH operations. Cache-to-cache intervention may be used to transfer the pushed data to a different processor. The intervention may improve performance by supporting a direct cache loading feedback mechanism from multiple processors to guide the PUSH operation allocation. In one embodiment, based on cache loading feedback information, the system may determine a least loaded processor to be the target of a PUSH operation.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a plurality of processors having cache traffic monitors to monitor cache traffic in the respective processors;
   a push optimizer coupled with the cache traffic monitors to receive cache traffic information and to determine a selected target processor for an operation to cause data to be pushed to a cache of the selected target processor; and
   a bus agent coupled with the plurality of processors to push data to the cache memory of the selected target processor.

2. The apparatus of claim 1 wherein the cache traffic information comprises a number of entries in a queue of entries to be stored in an associated cache.

3. The apparatus of claim 1 wherein the cache traffic information comprises a priority corresponding to entries in a queue of entries to be stored in an associated cache.

4. The apparatus of claim 1 wherein the selected target processor comprises one of the plurality of processors determined to be least loaded by the push optimizer.

5. The apparatus of claim 1 wherein the bus agent comprises a direct memory access (DMA) device.

6. The apparatus of claim 1 wherein the bus agent comprises a digital signal processor (DSP).

7. The apparatus of claim 1 wherein the bus agent comprises a packet processor.

8. The apparatus of claim 1 wherein at least one of the plurality of processors further comprises a register to store a value corresponding to a number of entries in the cache traffic monitor of the processor beyond which the cache memory is to be indicated as loaded.

9. The apparatus of claim 8 wherein the register is software accessible.

10. The system of claim 8 wherein the register is software accessible.

11. A method comprising:
    determining a load for a plurality of cache memories associated with a plurality of processors in a multi-processor system;
    generating a plurality of signals corresponding to the loads for the plurality of cache memories; and
    analyzing the plurality of signals corresponding to the load for the plurality of cache memories to select a target processor for an operation to push data from a bus agent to the cache memory associated with the target processor.

12. The method of claim 11 further comprising receiving from a software application one or more parameters to be used to select the target processor.

13. The method of claim 11 wherein analyzing the plurality of signals corresponding to the load for the plurality of cache memories to select the target processor comprises selecting a least loaded cache memory.

14. The method of claim 11 further comprising causing data to be pushed from the bus agent to the cache memory associated with the target processor.

15. The method of claim 14 wherein the bus agent pushes the data to the cache memory associated with the target processor without a corresponding read operation from the target processor.

16. The method of claim 14 wherein the bus agent comprises a direct memory access (DMA) device.

17. The method of claim 14 wherein the bus agent comprises a digital signal processor (DSP).

18. The method of claim 14 wherein the bus agent comprises a packet processor.

19. A system comprising:
    a bus;
    one or more substantially omnidirectional antennae coupled with the bus;
    a plurality of processors having cache traffic monitors to monitor cache traffic in the respective processors coupled with the bus;
    a push optimizer coupled with the cache traffic monitors to receive cache traffic information and to determine a selected target processor for an operation to cause data to be pushed to a cache of the selected target processor coupled with the bus; and
    a bus agent coupled with the bus to push data to the cache memory of the selected target processor.

20. The system of claim 19 wherein the cache traffic information comprises a number of entries in a queue of entries to be stored in an associated cache.

21. The system of claim 19 wherein the cache traffic information comprises a priority corresponding to entries in a queue of entries to be stored in an associated cache.

22. The system of claim 19 wherein the selected target processor comprises one of the plurality of processors determined to be least loaded by the push optimizer.

23. The system of claim 19 wherein at least one of the plurality of processors further comprises a register to store a value corresponding to a number of entries in the cache traffic monitor of the processor beyond which the cache memory is to be indicated as loaded.

24. The system of claim 19 wherein the bus agent comprises a direct memory access (DMA) device.

25. The system of claim 19 wherein the bus agent comprises a digital signal processor (DSP).

26. The system of claim 19 wherein the bus agent comprises a packet processor.

27. An apparatus comprising:
    a plurality of processors having cache traffic monitors to monitor cache traffic in the respective processors;
    a push optimizer coupled with the cache traffic monitors to receive a number of entries in a queue of entries to be stored in an associated cache and to determine a selected target processor for an operation to cause data to be pushed to a cache of the selected target processor; and
    a bus agent coupled with the plurality of processors to push data to the cache memory of the selected target processor.

28. The apparatus of claim 27 wherein the selected target processor comprises one of the plurality of processors determined to be least loaded by the push optimizer.

29. The apparatus of claim 27 wherein at least one of the plurality of processors further comprises a register to store a value corresponding to a number of entries in the cache traffic monitor of the processor beyond which the cache memory is to be indicated as loaded.

30. The apparatus of claim 29 wherein the register is software accessible.

* * * * *